Figure 1:
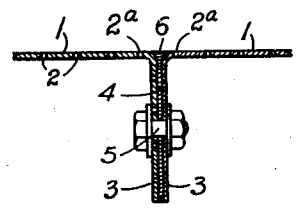

Oct. 27, 1936.  E. G. TURNER  2,059,156

CINEMATOGRAPH PROJECTION SCREEN

Filed Feb. 4, 1936

INVENTOR.
E. G. TURNER,
By Blair & Kilburn
Attys.

Patented Oct. 27, 1936

2,059,156

UNITED STATES PATENT OFFICE 2,059,156

CINEMATOGRAPH PROJECTION SCREEN

Edward George Turner, Walthamstow, London, England

Application February 4, 1936, Serial No. 62,343
In Great Britain October 20, 1934

8 Claims. (Cl. 88—24)

This invention relates to projection screens for cinematographs and more particularly to screens of this character for use in connection with sound film projection or in cases in which sounds accompanying the projection of the cinematograph pictures are produced on the side of the screen remote from the audience.

The projection screens at present employed are usually composed of flexible fabric composed of cotton or other textile material and are open to many disadvantages. The fabric requires to be stretched to a considerable degree to ensure a truly plane surface for projection, and the liability of the fabric to absorb and retain moisture in accordance with the state of the atmosphere causing expansion and contraction renders it difficult to maintain the screen in proper condition.

Furthermore, the fabric is inflammable, readily becomes dirty or discoloured and affects the transmission of sound waves through the screen to a greater or less extent depending upon the nature or varying condition of the fabric.

It has previously been proposed to construct cinematograph screens from perforated sheet metal mounted upon a wooden framework, this arrangement, however, involving the disadvantage that the framework which in order to maintain the necessary plane surface comprises a number of spaced supporting members at the rear of the screen reduces to a considerable extent the area available for sound transmission. It is usual to provide the front surface of the screen with a light reflecting or diffusing coating and an even more serious defect of the arrangement above described is that the portions of the coated screen in contact with the supporting members differ as regards their light reflecting qualities from the other portions of the screen so as to produce a want of uniformity in the projection surface which becomes more pronounced during the period of use and even in the case of a new or newly coated screen is sufficient to impair the appearance of the projected image.

One object of the present invention is to provide an improved screen of the perforated sheet metal type above referred to in which the screen is composed of a plurality of screen units or elements which are so mounted and secured to one another as to present a permanent substantially uniform screen surface under all conditions. Another object of the invention is to provide a screen structure which shall be sufficiently rigid when its component units are assembled together to prevent any possibility of distortion of the screen surface or interference with its sound transmitting efficiency.

Figure 2:
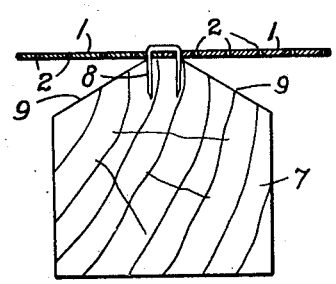

Other objects of the invention will be apparent from the following description:

The invention is illustrated by way of example in the accompanying drawing, Figure 1 of which is a transverse sectional view of portions of two screen elements at their abutting edges arranged to be secured together in accordance with one form of the invention, Figure 2 being a similar view of another construction also embodying the invention.

Figure 3:
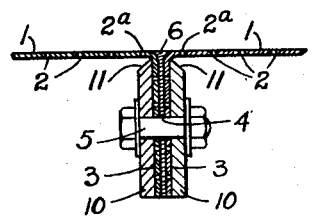
Figure 6:
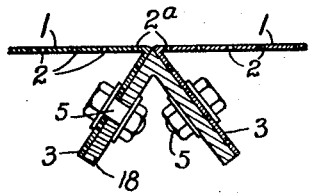
Figure 4:
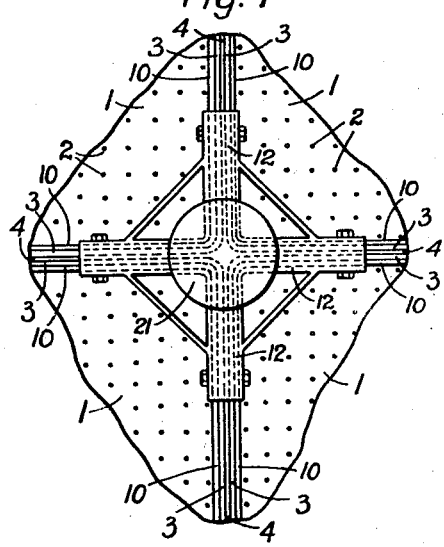
Figure 5:
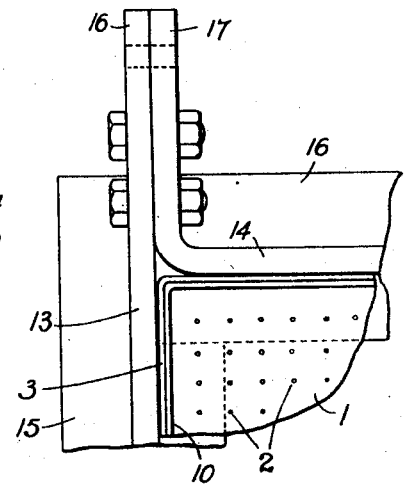

Figure 3 is a view similar to Figures 1 and 2 illustrating a preferred form of construction, Figure 4 being a view in rear elevation showing four adjacent screen units secured together in accordance with the construction of Figure 3. Figure 5 is a view in rear elevation of the upper corner of a screen constructed in accordance with Figures 3 and 4 showing the mounting of the screen units in a supporting frame. Figure 6 is a view similar to Figures 1 and 3 and illustrating a further construction for securing the screen units together in accordance with the invention.

Referring now to the drawing it will be seen that the screen is composed of a plurality of screen units or elements 1 each composed of a relatively thin metal sheet 1 provided with perforations 2 suitably distributed over the surface of the sheet. The size and spacing of the perforations are such as to provide for effective transmission of the sound waves through the screen while presenting at the normal distance from the eye a substantially uniform surface when the screen is coated in the usual manner.

The several screen units 1 are, in accordance with the invention, arranged to be secured together at their adjacent abutting edges so that no appreciable obstruction of the perforations adjacent to their edges occurs, the complete screen composed of the assembled units thus being the equivalent optically and acoustically of a single screen of perforated sheet metal with the advantages of unit construction as regards convenience in manufacture and installation and of increased rigidity.

Referring now to the construction shown in Figure 1, the edge of each of the screen units 1 is shown as bent sharply at right angles to the plane of the unit so as to form a flanged portion 3 adapted to abut against the corresponding flanged portion of the adjacent unit. Preferably a filling strip 4 is interposed between the adjacent flanged portions 3 of the abutted units 1 which are secured in position by suitable bolts or screws 5 traversing the flanged portions 3 and the filling strip 4. Each of the screen units 1 may extend horizontally or vertically across the full width or height of the complete screen in which case the horizontal or vertical edges only of each screen unit are bent so as to form the flanged portions 3, each screen unit being thus of shallow channel form. Preferably, however, the complete screen is composed of a plurality of screen units in both the horizontal and vertical directions in which case all the edges of each unit are bent so as to form flanged portions 3, the unit being thus in the form of a shallow tray.

It will be understood that the flanged portions 3 of the screen units, instead of being formed by bending the metal sheet, may be constituted by metal strips welded or otherwise secured to plane perforated metal sheets. The filling strips 4 may be provided with a flared head as indicated at 6 so as completely to fill up the groove between the corners of the flanged portions 3 and is preferably composed of relatively soft metal. The head 6 may be previously formed on the filling strip 4 or alternatively may be formed after assembly by caulking or hammering the projecting edge of the filling strip 4 so as to be eventually flush with the face of the screen.

The securing nuts or screws 5 are spaced at suitable intervals along the length of the flanged portions 3 of the screen units or alternatively these flanged portions 3 with or without a filling strip 4 may be otherwise secured together as, for instance, by spot welding.

It will be seen from Figure 1 that the bending of the edges of the screen units 1 to form the flanged portion 3 is so effected that the lines of the perforations 2a adjacent to the bends are spaced apart from one another at substantially the same distance as the other lines of perforations in the screen units so that after assembly of the units the spacing of the perforations 2 is substantially uniform over the whole surface of the screen and none of these perforations are masked or rendered ineffective by the connections between the several units.

In the construction shown in Figure 2, each of the screen units 1 is plane and their abutting edges are secured together and to a supporting batten 7 composed of wood or other suitable material by means of staples 8 passing through special perforations in the screen units 1. The edge of the batten 7 adjacent to the units is bevelled or chamfered as indicated at 9 so that the lines of perforations 2a adjacent to the abutting edges of the screen units 1 are unimpeded.

Referring now to the preferred construction shown in Figure 3, clamping strips 10 are provided adapted to engage with the inner faces of each of the flanged portions 3 as illustrated, the securing bolts or screws 5 passing through the clamping strips 10, the flanged portions 3 and the filling strip 4. The strips 10 are bevelled or chamfered at their edges adjacent to the face of the screen as indicated at 11 so as not to obstruct or cover the line of perforations 2a. The provision of the clamping strips 10 assists in maintaining the flanged portions 3 and the filling strip 4 in proper effective engagement and position. As shown in Figures 4 and 5 the clamping strips 10 for the flanged edges of each screen unit may be integral with or connected to each other so as to form a rectangular frame which greatly increases the rigidity and strength of the screen structure.

As shown in Figure 4 a spider bracket 21 is preferably provided at the joint between four adjacent screen units 1, the bracket 21 comprising four channel arms 12 adapted to embrace the clamping strips 10, the flanged portions 3 of the screen units and the filling strips 4 adjacent to the corners of the screen units.

As shown in Figure 5, the vertical and horizontal edges of the screen are secured to frame members, 13, 14 having frame flanges 15, 16 secured thereto or formed integral therewith which surround and overlap the edges of the screen, the frame members 13, 14 being provided with lugs 16, 17 for the suspension of the screen in a vertical plane.

Figure 6 shows another construction in which the edges of the screen units 1 are bent at an angle of approximately 60° so as to form flanged portions 3 which are secured to an angle-iron supporting member 18 by bolts or screws 5 so as to cause the plane portions of the screen units 1 to abut against one another as illustrated.

In any of the constructions described with reference to Figures 1, 3 and 6 the screen structure may if desired be further reinforced by horizontal or vertical stay rods or bars arranged in a plane parallel to the screen surface and passing through any desired number of the rear flanged portions and their associated parts.

The invention is evidently not limited to the particular constructional arrangements above described and illustrated by way of example and it will be understood that various changes and modifications may be made therein within the scope of the appended claims without departing from the spirit and scope of the invention.

Having now described my invention, what I claim as new and desire to secure by Letters Patent is:—

1. In a cinematograph projection screen, the combination of a plurality of screen units each composed of a single plane sheet of thin metal provided with relatively small and closely spaced lines of perforations, the edge of one of said units abutting against the edge of an adjacent unit, and means for securing said edges together adjacent the line of abutment and between the lines of perforations immediately adjacent said line of abutment without obstructing the perforations in the plane of the screen.

2. In a cinematograph projection screen, the combination of a plurality of screen units each composed of a single plane sheet of thin metal provided with relatively small and closely spaced lines of perforations, and means for securing the abutting edges of said units together, said means engaging with said units only between adjacent lines of perforations on each side of the line of abutment in the plane of the screen.

3. In a cinematograph projection screen, the combination of a plurality of similar screen units each composed of a single plane sheet of thin metal provided with relatively small and closely spaced lines of perforations, and means for securing adjacent units together comprising elements having a cross sectional form tapering towards the rear faces of said units and engaging the units adjacent the lines of perforations in the plane of the screen.

4. In a cinematograph projection screen, the combination of a plurality of screen units each composed of a single plane sheet of thin metal provided with relatively small and closely spaced lines of perforations, the edges of each of said units being bent at an angle to form flanges, and means for securing said flanges of two adjacent units together throughout their full depth without obstructing the perforations in the plane of the screen.

5. In a cinematograph projection screen, the combination of a plurality of screen units each composed of a single plane sheet of thin metal provided with relatively small and closely spaced perforations having at least one pair of opposite edges bent sharply at right angles to the plane of the sheet, and means for securing the bent portion of one of said units in abutting engagement with the bent portion of an adjacent unit without obstructing the perforations in the plane of the screen.

6. In a cinematograph projection screen, the combination of a plurality of screen units each composed of a single plane sheet of thin metal provided with relatively small and closely spaced perforations having at least one pair of opposite edges bent sharply at right angles to the plane of the sheet, a filling strip interposed between said bent edges of adjacent units, and means for securing the bent edge of one of said units in abutting engagement with said strip and with the bent edge of the adjacent unit without obstructing the perforations in the plane of the screen.

7. In a cinematograph projection screen, the combination of a plurality of screen units each composed of a single plane sheet of thin metal provided with relatively small and closely spaced lines of perforations, the edges of each of said units being bent at an angle to form flanges, means for securing the flanged edges of two adjacent units together without obstructing the perforations in the plane of the screen and a clamping strip engaging with the face of each of said flanges, the edge of said strip being chamfered adjacent said angle.

8. In a cinematograph projection screen, the combination of a plurality of screen units each composed of a single plane sheet of thin metal provided with relatively small and closely spaced perforations, the edges of each of said units being bent at an angle to form flanges, a clamping strip engaging with the inner face of each of said flanges, means for securing said strips and said flanges on adjacent units together without obstructing the perforations in the plane of the screen, and a spider bracket embracing said strips and flanges adjacent the junction of four adjacent units.

EDWARD G. TURNER.